United States Patent [19]

Miller et al.

[11] 4,092,196

[45] May 30, 1978

[54] RETREADING AND REBUILDING OF RADIAL TIRES

[75] Inventors: Rickie L. Miller, Suffield; Noel E. Walters, Tallmadge, both of Ohio

[73] Assignee: The Goodyear Tire & Rubber Company, Akron, Ohio

[21] Appl. No.: 668,891

[22] Filed: Mar. 22, 1976

[51] Int. Cl.² .................... B29H 17/14; B29H 17/37
[52] U.S. Cl. ................................ 156/96; 152/361; 156/123 R; 156/128 N; 157/13
[58] Field of Search ............... 156/95, 96, 123, 128; 152/185, 209 R, 354, 361; 157/13

[56] References Cited

U.S. PATENT DOCUMENTS

| | | | |
|---|---|---|---|
| 1,678,211 | 7/1928 | Davidson | 152/361 R |
| 2,982,328 | 5/1961 | Emanueli et al. | 152/361 R |
| 2,996,098 | 8/1961 | Lyon | 152/361 R |
| 3,464,873 | 9/1969 | Hawkinson | 156/96 |

*Primary Examiner*—William A. Powell
*Assistant Examiner*—John E. Kittle
*Attorney, Agent, or Firm*—R. S. Washburn; Frederick K. Lacher

[57] ABSTRACT

A method of retreading a radial tire whose belts are damaged and require removal. A narrow, inextensible band is centrally disposed around the outer periphery of the tire after the worn tread and damaged belts have been removed. The band restricts expansion of the tire to a diameter correlated to the diameter of the tire when newly molded and vulcanized.

10 Claims, 2 Drawing Figures

RETREADING AND REBUILDING OF RADIAL TIRES

BACKGROUND OF THE INVENTION

The invention is particularly suitable for use in the retreading of a radial truck tire having a belt structure of metal reinforcement cords, wherein the belt structure is damaged and requires removal of a number of belt plies sufficient to adversely affect the ability of the belt structure to restrict expansion of the tire, when inflated. In such cases, it is necessary to prevent over-expansion of the tire casing when the restraint of the belt structure is removed. The invention is directed to solving this problem.

Briefly stated, the invention is in the provision of a narrow, inextensible band centrally around the outer peripheral surface of the tire casing after the worn tread and damaged belt plies have been removed. The band is narrow enough to restrict expansion of the tire casing, when inflated, but not wide enough to radically alter the reinforcement characteristics of the belt structure being rebuilt.

U.S. Pat. No. 1,678,211 discloses the use of a single metal cord, or wide metal band, to restrict expansion of the tire at its centerline for the purpose of ballooning out the sidewalls of the tire to increase the width of the tire tread and hopefully improve traction of the tire.

U.S. Pat. No. 3,464,873 is concerned with the conversion of a bias tire to a bias-belted tire by removing the tread of the bias tire and then interposing a breaker structure between the buffed tire casing and a newly formed tread on the casing. The patent discloses an inextensible breaker structure for placement around the outer periphery of the bias tire after it is distorted and reduced to the rolling radius of the tire. Such a step would be impractical and detrimental to the retreading of a radial tire, since the rolling radius of a radial tire varies substantially from the normal radius of the tire, when inflated. Thus, both patents are concerned with totally different technology and techniques which are simply not suitable in the retreading of a radial truck tire having a belt structure which is severely damaged and needs repair or replacement.

DESCRIPTION OF THE DRAWING

The following description of the invention will be better understood by having reference to the annexed drawing, wherein.

DESCRIPTION OF THE INVENTION

Figure 1:
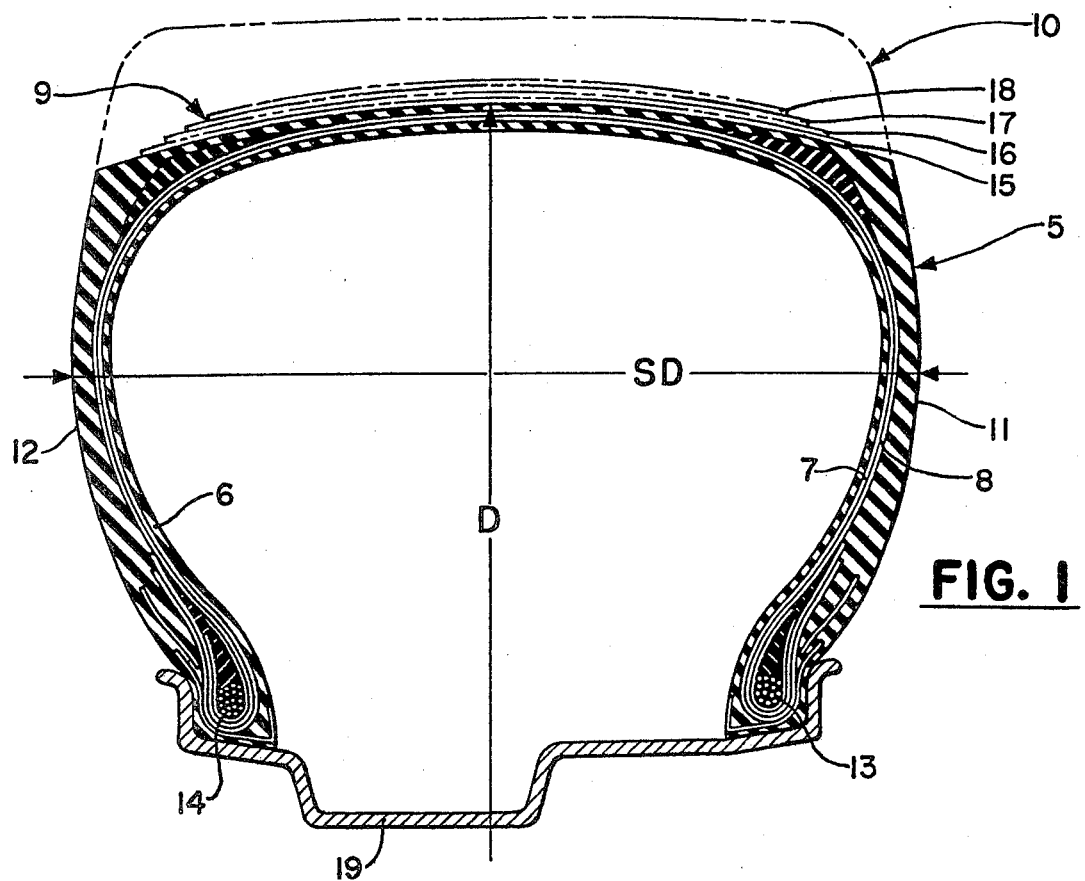
FIG. 1 is a cross-section of a radial tire.
Figure 2:
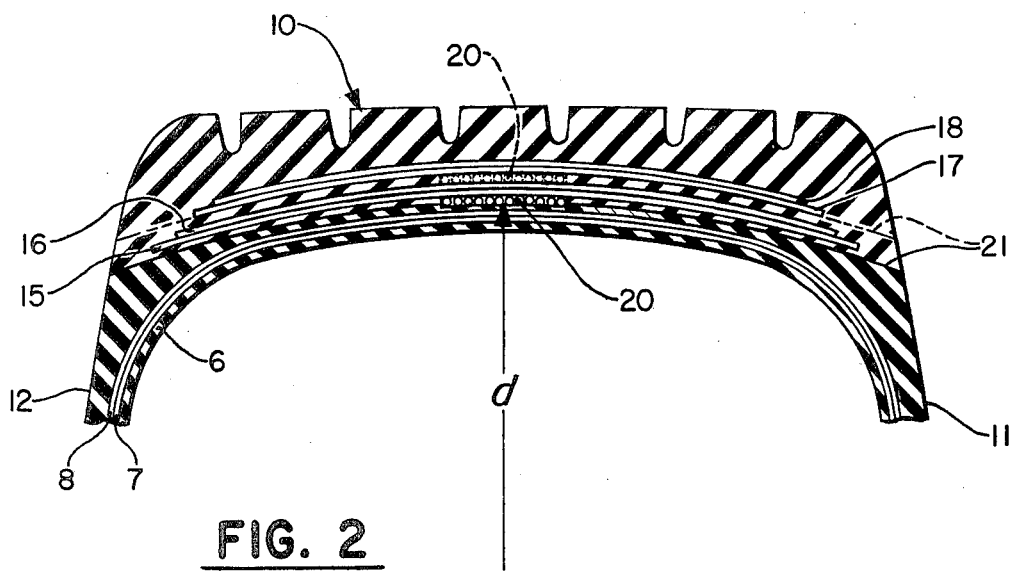
FIG. 2 is a section of the tire, illustrating the retreading of the tire in accordance with the invention.

With reference to the drawing, there is shown a radial tire 5 which comprises conventional components of a fluid impervious innerliner 6; a single, or plurality of carcass plies 7,8 reinforced with parallel cords composed of rayon, nylon, polyester, aramid, or steel; a belt structure 9 for annularly reinforcing the radial tire 5, the belt structure 9 also being reinforced with individual layers of parallel cords composed of rayon, nylon, polyester, glass fibers, aramid, or steel; and a tread 10 and pair of sidewalls 11,12 surrounding the carcass plies 7,8 and terminating at a pair of inextensible annular beads 13,14.

The belt structure 9, in this case, is composed of four superimposed belt plies 15-18, each of which is reinforced with parallel metal cords disposed at angles of from 11 to 24 degrees measured in relation to a plane containing the mid-circumferential centerline of the tread 10, such plane hereinafter referred to as the centerplane. The metal reinforcement cords of the two innermost plies 15,16 extend in the same but opposite direction from that of the metal reinforcement cords of the two outermost plies 17,18 which also extend in the same direction. The reinforcement cords of the carcass plies 7,8 are disposed at angles in the range of from 75° to 90° measured from the centerplane.

The diameter D of the tire casing, i.e. the overall diameter of the tire 5, minus twice the combined thickness of the belt structure 9 and tread 10, can be readily computed for any given tire, when inflated and mounted on a conventional wheel rim 19. It is important to restrict the expansion of the retreaded tire casing to the same diameter D, such that the retreaded tire will be the same size as the tire originally was when newly molded and vulcanized.

The worn tread 10 and damaged belt structure 9 is readily removed by any conventional means such as buffing, or cutting. It is only necessary to remove the two outermost belt plies 17,18 to eliminate the so-called cross-hatching effect of the reinforcement cords of the belt structure 9 and consequent restrictive action of the belt structure 9 in preventing over-expansion of the radial tire 5. Thus, the invention can be utilized in any case where the restrictive effect of the belt structure 9 is destroyed by the removal of any of the individual belt plies 15-18. After the tread 10 and necessary belt plies are removed, the beads 13,14 of the tire 5 are moved either toward or away from each other to change the outer diameter $d$ of the tire casing until it equals the desired diameter D of the inflated tire 5.

A narrow, inextensible band 20 is then wrapped centrally around the outer periphery 21 of the buffed tire 5 to restrict expansion of the tire during the retreading process (note position of band 20 in dotted and full lines when two outermost belt plies 17,18 and complete belt structure 9, respectively, are removed). The band 20 is composed of inextensible cords composed of materials such as glass fibers, metal, or aramid. The cords are parallel and extend longitudinally of the band 20. The band should be wide enough to restrict expansion of the radial tire 5, but not too wide, as to radically alter the operational characteristics of the renewed belt structure. The width of the band 20 naturally depends on the size of the tire 5. It is good to maintain the width of the band 20 in the range of from 5 percent to 15 percent of the section diameter SD of the tire. A one-inch wide band 20 was found especially suitable for a size 10:00-20 tire. The ends of the band 20 are overlapped about 3-4 inches, rather than butted. A smaller width band, e.g. ½-inch, can be spirally wound twice around the outer periphery 21 to form the one-inch wide band 20. Thus, the band 20 can be made in a number of ways, so long as it is kept narrow enough not to adversely affect the operational characteristics of the belt. The removed belt plies are at least replaced with like belt plies such that the new belt structure is essentially the same as the old one. New tread material is then placed around the renewed belt structure by any suitable means. The new tread can be composed of unvulcanized rubber material, or it can be previously molded and vulcanized. A new tread of unvulcanized rubber material is usually conventionally molded and vulcanized to produce a pattern of ribs and grooves in the tread. In cases of large earthmover type tires requiring removal and repair of the belt structure, as previously outlined, the pattern of lugs and grooves can be formed by conventional molding, or by hand or machine grooving the tread before or after vulcanization of the rubber material of the tread. The renewed belt structure can be precured or vulcanized in cases where the old belt structure is damaged and requires complete removal. When using precured components of tread and belt structure, it is advantageous to use the so-called "hot" process of permanently bonding the precured tread, or belt structure, to the tire casing; i.e. heating the retreaded and rebuilt tire in an atmosphere of steam or air at temperatures of 200° F. or greater, as distinguished from the so-called "cold" process where the precured components are bonded to the tire casing at room, or slightly elevated room temperatures.

Thus, there is provided a method of preventing overexpansion of a radial tire whose restrictive belts have been damaged and removed for replacement. In this manner, the size and shape of the retreaded tire is essentially the same as the tire was when it was newly molded and vulcanized.

What is claimed is:

1. A method of retreading a radial tire having damaged belt plies comprising:
    (a) removing the worn tread of the tire;
    (b) removing the damaged belt plies of the belt structure interposed between the carcass plies and tread of the tire;
    (c) at least replacing the removed belt plies with like belt plies to form a renewed belt structure;
    (d) winding a narrow, inextensible band centrally around the outer periphery of the tire, when the worn tread and damaged belt plies are removed, the band being separate from the belt plies and wide enough to restrict expansion of the tire beyond a desired diameter correlated to the diameter of the tire when newly molded, vulcanized, and inflated, and narrow enough not to radically change the operational characteristics of the renewed belt structure;
    (e) replacing the worn tread with a new tread; and
    (f) bonding the new tread and belt plies to the tire.

2. The method of claim 1, wherein the band is composed of inextensible cords which are embedded in rubber material and extend longitudinally of the band.

3. The method of claim 2, wherein the worn tread is replaced with a previously molded and vulcanized tread.

4. The method of claim 2, wherein the cords are composed of aramid.

5. The method of claim 2, wherein the width of the band is from 5 percent to 15 percent of the section diameter (SD) of the tire, and the band has opposing ends which are overlapped.

6. The method of claim 2, wherein the band is spirally wrapped at least twice around the tire.

7. The method of claim 2, wherein the worn tread is replaced by a tread of unvulcanized rubber material.

8. The method of claim 7, which includes vulcanizing the unvulcanized rubber material of the new tread, and forming a pattern of grooves in the new tread, prior to vulcanizing the rubber material thereof.

9. A method of retreading a radial tire having damaged belt plies comprising:
    (a) removing the worn tread of the tire;
    (b) removing the damaged belt plies of the belt structure interposed between the worn tread and carcass plies of the tire;
    (c) replacing the removed belt plies with like belt plies to form a renewed belt structure, the like belt plies composed of unvulcanized rubber material in which like reinforcement cords are embedded;
    (d) winding a narrow band of unvulcanized rubber, reinforced with inextensible cords which extend longitudinally of the band, centrally around the inner periphery of the tire when the worn tread and belt plies are removed, the band being separate from the belt plies and the width of the band being from 5 percent to 15 percent of the section diameter (SD) of the tire;
    (e) replacing the worn tread with a new tread of unvulcanized rubber material;
    (f) forming a pattern of grooves in the new tread; and
    (g) vulcanizing the unvulcanized rubber material of the new tread.

10. The method of claim 9, wherein the grooves are formed in the new tread, prior to vulcanization of the rubber material of the tread.

* * * * *